July 12, 1966      H. K. FRIZZELL      3,260,138
ATTACHMENT FOR A HAND DRILL OR THE LIKE
Filed June 18, 1964
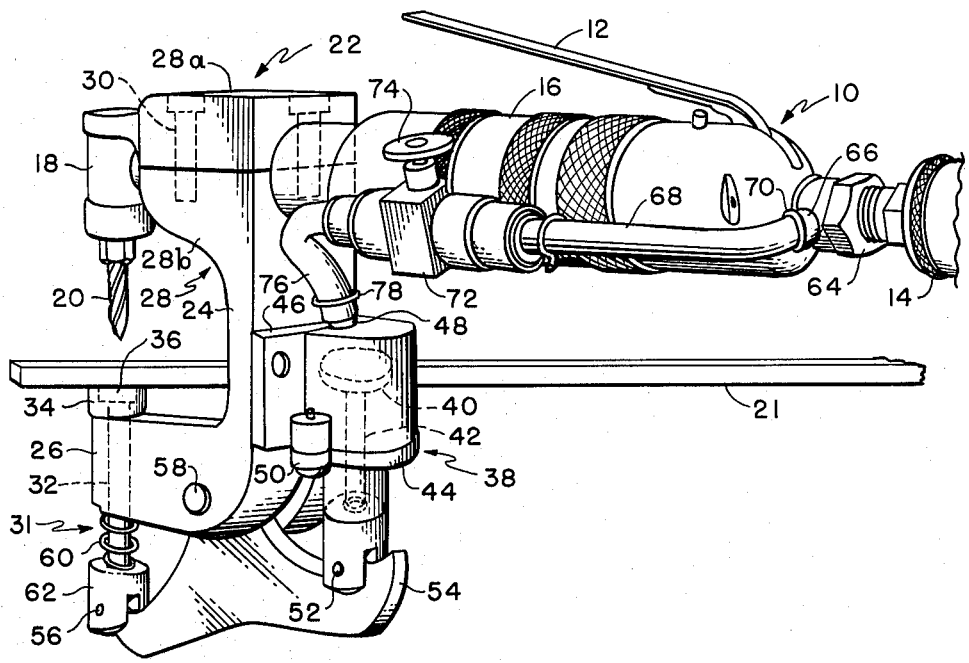
INVENTOR.
HARRY KENNETH FRIZZELL
BY
ATTORNEYS.

United States Patent Office 3,260,138
Patented July 12, 1966

3,260,138
ATTACHMENT FOR A HAND DRILL OR THE LIKE
Harry Kenneth Frizzell, Rockvale, Tenn., assignor to Avco Corporation, Nashville, Tenn., a corporation of Delaware
Filed June 18, 1964, Ser. No. 376,118
6 Claims. (Cl. 77—33.5)

This invention relates to an attachment for a pneumatically operated hand-carried machine tool, such as a drill, and more particularly to an attachment for a machine tool in which the working tool rotates on an axis at right angles to the axis of rotation of the machine tool drive, the attachment serving to drive the working tool towards the workpiece.

Generally this invention is applicable to hand-carried machines for drilling, reaming, or countersinking wherein the working tool rotates on an axis positioned at 90° with respect to the axis of the hand-held drive for the working tool. In such cases the drive, the casing of which provides the handle for the machine tool, may be held horizontally while the working tool is oriented vertically with respect to the workpiece. In mass production operations considerable time is consumed because of the inherent inefficiencies encountered by the operator in applying pressure to the workpiece. This invention provides a simple attachment for power driving the working tool toward the workpiece with minimum time and effort on the part of the operator.

It is an object of this invention to provide an attachment for a pneumatic drill, or other hand-operated machine tool, in which the working tool rotates on an axis at 90° with respect to the axis of the machine tool drive, the attachment serving to drive the working tool towards the workpiece.

Another object of this invention is to provide an attachment for a workpiece which requires no modification of standard commercially available, portable apparatus such as drills, reamers, etc.

Another object of this invention is to provide a U-shaped attachment for a pneumatically operated machine tool, one arm of the attachment being clamped around the axis of the machine tool drive, the other arm carrying a plunger, movable at right angles to the drive axis for engaging a workpiece, pneumatic power means being mounted on the base of the attachment for driving the plunger and hence driving the working tool of the machine tool toward the workpiece.

For other objects and a better understanding of the invention, reference should now be made to the following detailed specification and to the accompanying drawing in which the single figure depicts a preferred embodiment of this invention.

The drawing shows a standard, commercially available, pneumatically operated drill, generally indicated at 10, provided with a lever 12 controlling a valve (not shown) connecting a pneumatic power source at 14 to a rotary-type pneumatic drive (not illustrated) housed within and having its axis of rotation parallel to the longitudinal axis of the casing 16. The drive is coupled through gearing to a chuck 18 in which a drill bit 20 is secured. A fixedly secured workpiece is indicated at 21. Thus, the machine tool is of the portable type in which the axis of the drive is at right angles to the axis of rotation of the working tool.

The attachment for the machine tool 10 includes a U-shaped yoke, indicated at 22, having a base member 24 and arm members 26 and 28. The arm 28 is split in a horizontal plane to provide sections 28a and 28b, the two sections together having a cylindrical bore with the same geometry as the end of the casing 16 adjacent the working tool 20. Screws 30 are used to clamp the sections 28a and 28b together and to the machine tool casing.

The arm 26 is provided with a bore located on the axis of the tool 20. A plunger 31 having a stem 32 and an anvil 34 rides within the bore. The anvil 34 is provided with a recessed portion 36 to avoid contact of the anvil 34 with the tool 20 as a drilling operation is completed.

The drive for the plunger 31 includes a piston, generally indicated at 38, and including a piston head 40 and piston rod 42 positioned for longitudinal movement under pneumatic pressure within a cylinder 44. The cylinder 44 is rigidly secured to the base member 24 by means of a bracket 46. Pneumatic pressure is applied through an inlet at 48 and an adjustable bleed outlet 50 is provided at the opposite end of the cylinder.

The piston rod 42 is pivoted at 52 to one end of a lever 54, the other end of which is pivoted at 56 to the stem 32 of plunger 31. An intermediate portion of the lever 54 is pivoted adjacent the junction of the members 24 and 26 of the yoke 22 at 58. A spring 60 mounted on the stem 32 between the member 26 and a flange 62 biases the piston head 40 into an initial position adjacent the inlet 48. The attachment also includes a pneumatic coupling adapter 64 which serves to couple the power source at 14 to the drive. In addition, the coupling adapter 64 is provided with an outlet at 66 to which tubing 68 is secured by means of a clip 70. The tubing 68 is in turn coupled to the inlet 48 of the cylinder 44 through a valve 72 having an operating button 74 and through additional tubing 76 clamped to the inlet 48 by means of a clip 78.

In operation, an operator holding the casing 16 in one hand could simultaneously or selectively depress the lever 12 admitting pneumatic power to the rotary drive and depress the button 74 admitting pneumatic power to the piston head 40 in variable amounts. As pressure builds up, the piston head 40 and piston rod 42 move downwardly, causing the lever 54 to pivot at 58, and the plunger 31 is in turn driven upwardly. Since the workpiece 21 is fixedly secured, the pressure of the anvil 34 against the workpiece causes the downward motion of the entire yoke, carrying with it the working tool 20. The pressure of the working tool 20 against the workpiece 21 is continuously regulatable by the operator who may adjust the opening of the valve by means of the button 74. As a drilling operation is nearing completion, the tool 20 enters the recess 36 and does not contact the anvil 34.

It will be apparent to persons skilled in the art that the present invention is susceptible of various modifications and adaptations. It is intended, therefore, that the invention be limited only by the scope of the appended claims as interpreted in the light of the prior art.

What is claimed is:

1. An attachment for a pneumatically operated hand machine having a pneumatic rotary drive, the axis of rotation of said drive being disposed at right angles to the axis of rotation of the working tool of said machine, and for actuating said tool toward a fixed workpiece, the combination comprising:

a U-shaped yoke having a base member and two arm members approximately at right angles to said base;

means for clamping one of said arm members to said drive, said tool being parallel to said base member;

a pivot at the junction of said base member and the other arm member;

a plunger extending through said other arm member, said plunger being movable along the axis of said tool;

a lever pivoted from between its end on said pivot, one end of said lever being pivotally coupled to said plunger;

a cylinder supported from said base;

a piston, said piston having its head in an initial position in said cylinder;

a piston rod pivotally coupled between said head and the other end of said lever;

a pneumatic coupling for supplying pneumatic power to said drive, said coupling including an outlet, said outlet being coupled to the head of said piston through a normally closed hand-operated variable valve, whereby the opening of said valve produces pneumatic pressure on said head and causes said piston and said piston rod to move in said cylinder and to rotate said lever on said pivot, thereby driving said plunger toward said tool; and means for returning said piston to its initial position when said valve is closed.

2. The invention as defined in claim 1 wherein said one arm member of said yoke is split in a plane parallel to the axis of said drive and said one arm member has a longitudinal bore along said axis, said bore having dimensions corresponding to the dimensions of said drive, and wherein said means for clamping said one arm member to said drive comprises means for securing said split portions together with said drive firmly secured in said longitudinal bore.

3. The invention as defined in claim 2 wherein said cylinder is sealed at both ends; and adjustable bleed means at the end of said cylinder in the line of travel of said head from its initial position.

4. The invention as defined in claim 3 wherein said means for returning said piston to its initial position when said valve is closed comprises a spring on said plunger, said spring exerting a force on said lever tending to drive said head towards its initial position.

5. The invention as defined in claim 4 wherein said plunger includes an anvil normally bearing against said workpiece, said workpiece being located between said working tool and said anvil.

6. The invention as defined in claim 5 wherein said anvil is recessed along the axis of said working tool to accommodate said working tool when an operation is completed.

References Cited by the Examiner

UNITED STATES PATENTS 1,135,475   4/1915   Wanamaker et al. _____ 77—6

FRANCIS S. HUSAR, *Primary Examiner*.